Oct. 25, 1960   J. A. DVORAK   2,957,572
MULTIPLE STRAND CONVEYOR
Filed May 2, 1957
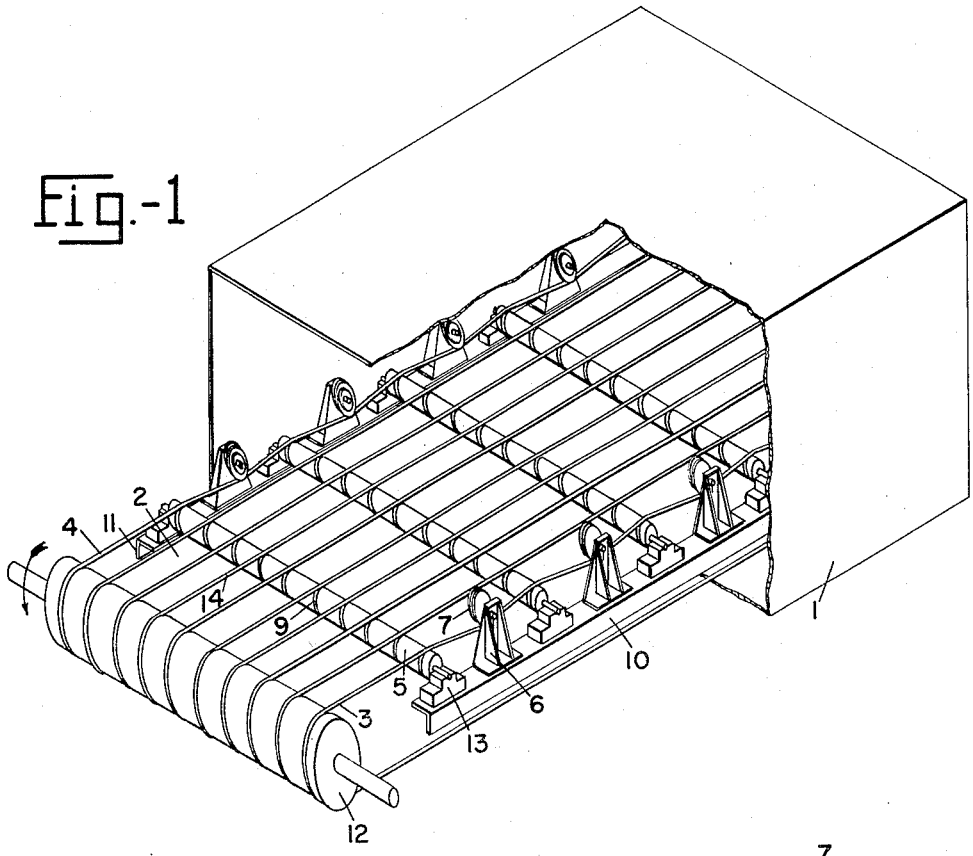
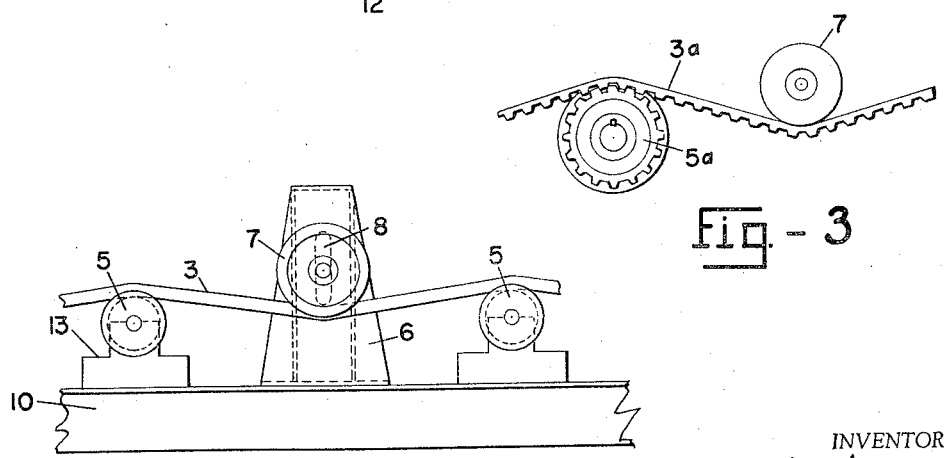
INVENTOR.
John A. Dvorak

United States Patent Office 2,957,572
Patented Oct. 25, 1960

2,957,572

MULTIPLE STRAND CONVEYOR

John A. Dvorak, Parma, Ohio, assignor to Ferro Corporation, Cleveland, Ohio, a corporation of Ohio Filed May 2, 1957, Ser. No. 656,669

2 Claims. (Cl. 198—203)

This invention relates as indicated to conveyors and more particularly to means for conveying articles through corrosive liquids encountered during cleaning of the articles.

In such prior art apparatus as automatic liquid pickling machines, bonderizing machines, industrial washing machines, vapor and liquid degreasers and the like, where articles are conveyed through the apparatus supported on wire mesh belts, rubber cables and other similar devices having supporting rollers, it is necessary to pass the rollers involved through the sides of the apparatus to support bearings placed on the outside of the equipment. Due to the presence of particularly corrosive fluids such as sulfuric acid, strong alkali solutions, etc. used in these apparatus the roller bearings and driving mechanisms must be placed outside the housings. This necessitates complicated and expensive liquid and/or vapor seals at the point where the rolls pass through the housing.

It is therefore the principal object of the present invention to provide comparatively simple conveying mechanisms adapted to be used in such apparatus and arranged so as to eliminate the need for passing the rolls through the housings and thus eliminating the need for fluid and/or vapor seals.

Other objects of the invention will appear as the description proceeds.

To the accomplishment of the foregoing and related ends, the invention, then comprises the features hereinafter fully described and particularly pointed out in the claims, the following description and the annexed drawings setting forth in detail one illustrative embodiment of the invention this being indicative, however, of but one of the various ways in which the principle of the invention may be employed.

In said annexed drawings:

Fig. 1 is a perspective view of a conveyor and housing, partly in section, embodying the present invention;

Fig. 2 is an enlarged side elevation, showing features of the present conveyor driving means; and Fig. 3 is an enlarged fragmentary side elevation, showing a modified form of driving means.

Referring now more specifically to the drawings, the conveyor of the present invention is shown for purposes of illustration as embodied in a treating apparatus in which articles carried by the conveyor are washed or treated in corrosive solutions as they are carried through the tank. It is to be understood the conveyor may, however, be useful in other kinds of apparatus for other purposes.

The illustrative apparatus includes part of a unit to be used for example for spraying hot sulphuric acid solution on metallic articles prior to porcelain enameling and includes a portion through which the articles are fed on a conveyor. The present invention relates to the conveyor and the other parts of the apparatus will not, therefore, be described further, except insofar as may be necessary for sufficient disclosure of the features of construction and of operation of the conveyor.

The conveyor 2 is completely enclosed within housing 1, which as previously indicated comprises a corrosive treatment chamber. It will be noted that the sidewalls of the housing 1 are substantially solid and are not provided with any orifices for extending therethrough the shafts of the carrier rolls 5. Thus the outstanding feature of the present invention will now be readily seen. For the first time a conveyor is provided substantially complete within a tank of corrosive liquid and there is no need for providing seals to prevent corrosive liquid from escaping through the sidewalls of the tank.

The conveyor 2 comprises bearing beams 10 and 11 whch are supported on the interior of housing 1 and are secured in position in any suitable manner. The beams 10 and 11 serve as supports for a plurality of carrier rolls 5. The shafts of carrier rolls 5 are supported as by bearings 13 which are secured to beams 10 and 11 by any suitable means. Also secured to beams 10 and 11 and alternately placed between bearings 13 are tensioning means 6 which are provided with vertically adjustable sheaves 7. Endless drive cables 3 and 4 adjacent each end of carrier rolls 5 are disposed over the rolls 5 and under sheaves 7 as more clearly shown in Fig. 2. Endless drive cables 3 and 4 are disposed around and driven by drive roll 12, which drive roll is rotated as by an electric motor (not shown). The only portion of the conveyor not disposed within the treating chamber proper is drive roll 12 and the driving means therefor. As best illustrated in Fig. 3 endless drive cables 3, if desired, could be made as cog belt 3a and carrier rolls 5 provided with a cog 5a for engaging the teeth of belt 3a.

The portion of the conveyor, between endless drive cables 3 and 4, for carrying the articles through the treatment chamber could be a plurality of cables 14 as shown in Fig. 1 or it could be an endless belt of the flexible open network type or other types of conveyor belts well known to those skilled in the art. If the endless cables 14 are used it is preferred to provide the carrier rolls 5 and drive roll 12 with a series of inscribed notches 9 which would aid in keeping the cables 14 in substantially straight lines.

Referring more specifically to tensioning means 6 it will be seen that sheaves 7 are movably mounted in vertical slot 8. Thus by moving the sheaves 7 downwardly against drive cables 3 and 4, pressure is produced on carrier rolls 5 causing them to rotate when belts 3 and 4 are in motion. The rotation of rolls 5 in turn causing the article carrying portion 14 of the conveyor to move.

The article conveying portion 14 whether comprising a plurality of cables or a flexible chain belt or a rubber belt, rests on carrier rolls 5. When a load is placed on the active surface of work conveyor 14 the cables, etc. come into frictional contact with the rolls 5 and are thus caused to carry the articles forward.

However, whether there is a load on conveying portion 14 or not, rolls 5 are constantly rotated due to the frictional contact of drive cables 3 and 4. Thus the present conveyor uses a completely frictional drive.

Other modes of applying the principle of the invention may be employed, change being made as regards the details described, provided the features stated in any of the following claims or the equivalent of such be employed.

I, therefore, particularly point out and distinctly claim as my invention:

1. An apparatus for conveying articles between spaced confining side-walls adapted to form an open-ended corrosive treatment chamber and comprising in combination, a pair of supporting beams disposed in parallel spaced relation within the chamber to provide a conveyor support extending therethrough, a plurality of bearing means mounted in spaced relation along each of said supporting beams, a plurality of driven rollers disposed in spaced parallel relation across said supporting beams and each having its axial extremities journaled respectively in corresponding bearing means on each beam, each of said driven rollers having a plurality of axially spaced, circumferentially disposed grooves, a first endless belt disposed in overrunning relation across said driven rollers adjacent one of said supporting beams, drive roller means disposed external to said chamber and drivingly engaging said first endless belt, a plurality of tensioning means mounted in spaced relation along the adjacent supporting beam and disposed successively between said driven rollers for engagement with said first endless belt, each of said tensioning means having a sheave for engaging said first endless belt and including a bracket having a vertical slot and a spindle rotatably supporting said sheave and adjustably disposed for vertical movement within the slot to position said belt into driving engagement with each of said driven rollers, and an endless article conveying belt including a plurality of strands disposed in parallel spaced overrunning relation about said driven rollers and said drive roller means and each adapted to coact with articles disposed on said belt to drivingly engage the rollers and track in the corresponding roller grooves.

2. The apparatus of claim 1 wherein each of said driven rollers carries a cog wheel at the axial extremity adjacent said first endless belt and wherein said first endless belt is in the form of a cog wheel belt adapted for driving engagement with each of said cog wheels.

References Cited in the file of this patent
UNITED STATES PATENTS

| | | |
|---|---|---|
| 1,738,427 | Griffith | Dec. 3, 1929 |
| 1,880,954 | Fahrenwald | Oct. 4, 1932 |
| 2,622,721 | Ferguson | Dec. 23, 1952 |
| 2,642,174 | Buccicone | June 16, 1953 |
| 2,759,594 | Kleboe et al. | Aug. 21, 1956 |